United States Patent
Rakoff et al.

(10) Patent No.: US 7,546,326 B2
(45) Date of Patent: Jun. 9, 2009

(54) SYSTEM AND METHOD FOR GENERATION OF AN INFORMATION HANDLING SYSTEM MOF FILE FROM CIM METADATA

(75) Inventors: Nathan Rakoff, Round Rock, TX (US); Radhakrishna Reddy Dasari, Round Rock, TX (US); Linda Martinez, Pflugerville, TX (US); Jianwen Yin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 250 days.

(21) Appl. No.: 11/283,180

(22) Filed: Nov. 18, 2005

(65) Prior Publication Data

US 2007/0130235 A1 Jun. 7, 2007

(51) Int. Cl.
*G06F 12/00* (2006.01)
(52) U.S. Cl. ...................................... 707/205
(58) Field of Classification Search .................. 707/205
See application file for complete search history.

(56) References Cited

U.S. PATENT DOCUMENTS

| 6,292,932 | B1 * | 9/2001 | Baisely et al. ............... 717/114 |
| 6,684,386 | B1 | 1/2004 | Baisely ....................... 707/114 |
| 6,711,734 | B1 | 3/2004 | Baisely ....................... 717/104 |
| 6,751,631 | B2 | 6/2004 | Hrebejk et al. ............... 707/103 |
| 6,754,671 | B2 | 6/2004 | Hrebejk et al. ............... 707/103 |
| 7,177,793 | B2 * | 2/2007 | Barker et al. ..................... 704/8 |
| 2005/0108725 | A1 * | 5/2005 | Hudis et al. ................. 719/316 |
| 2006/0026195 | A1 * | 2/2006 | Gu et al. ..................... 707/102 |

* cited by examiner

*Primary Examiner*—Charles Rones
*Assistant Examiner*—Fazlul Quader
(74) *Attorney, Agent, or Firm*—Robert W. Holland; Hamilton & Terrile, LLP

(57) ABSTRACT

A MOF file for management information of an information handling system is automatically generated from CIM metadata that represents the configuration of the information handling system and a CIM schema that defines classes of the CIM. A MOF file precompiler extracts MOF classes from the CIM metadata and applies the CIM schema to automatically generate the MOF file for the information handling system. A CIMOM mapping tool maps settings of different operating systems, such as WMI and Open WBEM, to provide a MOF file associated with each operating system's CIMOM implementation.

4 Claims, 3 Drawing Sheets

SYSTEM AND METHOD FOR GENERATION OF AN INFORMATION HANDLING SYSTEM MOF FILE FROM CIM METADATA

BACKGROUND OF THE INVENTION

1. Field of the Invention

The present invention relates in general to the field of information handling system management, and more particularly to a system and method for generation of an information handling system MOF file.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have tremendous flexibility in part due to the wide variety of components available for building systems to achieve desired processing goals. However, the corollary to such flexibility is that information handling system manufacturers often struggle to integrate components and systems with each other. In response, industry has formed a Distributed Management Task Force (DMTF) System Management Work Group (SMWG) that seeks to standardize system management software, such as by encouraging compliance with the Common Information Model (CIM) standards. CIM exchanges management information in a platform-independent and technology-neutral manner to standardize integration and reduce costs by enabling end-to-end multi-vendor interoperability of management systems. CIM applies an object oriented model to describe an organization's processing and networking environments, such as available hardware software and services. However, the CIM schema has grown complicated with thousands of classes defined in hundreds of Managed Object Format (MOF) files. MOF files are text documents that contain definitions of object-oriented classes and instances. The interdependent relationships among the classes defined in the standard MOF files have grown increasingly complex as the CIM standard has evolved through successive versions.

One difficulty with the complexity of the CIM schema is that manual entries for generating a MOF file or set of MOF files are often complex, requiring an in-depth understanding of the class definitions in the MOF schema to build relationships based on the schema. Since there are significant differences between versions of the MOF schema, updating to a new schema typically requires a reworking of the manually generated MOF files. Due to significant differences between CIM Object Managers (CIMOM), manual steps are typically required to create a Windows Management Instrumentation (WMI) compliant MOF file and an Open Web-Based Enterprise Management (Open WBEM) compliant MOF file. Such manual steps are time consuming and susceptible to mistakes and MOF files generated by different vendors are likely to be inconsistent. Generally, MOF files are compiled in a certain order, such as; by compiling MOF files with classes in the derivation tree parents first order, or by inserting "#include" to interrelate MOF files, or by creating a large MOF file with every class defined in the right order. However, these techniques tend to introduce inconsistencies and tend to require rewriting when new CIM schema versions are introduced. Inaccuracies effect system operations since MOF files are the way that a provider programmer and client application programmer communicate and working independently is difficult, usually resulting in the same developer writing both provider and client applications.

SUMMARY OF THE INVENTION

Therefore a need has arisen for a system and method which automatically generates MOF files.

In accordance with the present invention, a system and method are provided which substantially reduce the disadvantages and problems associated with previous methods and systems for generating MOF files. A MOF file for an information handling system is automatically generated from CIM metadata representing the configuration of the information handling system and a CIM schema.

More specifically, a MOF file precompiler applies CIM metadata representing the configuration of an information handling system and a CIM schema to automatically generate MOF files for management of the information handling system. An extraction tool extracts the MOF classes based on CIM metadata and references the CIM schema to identify all required parent, child and association classes. A CIMOM mapping tool maps the special settings of any supported operating system CIMOM implementation, such as WMI and Open WBEM CIMOMs, to support creation of a MOF file. A MOF generator applies the extracted MOF classes and the desired operating system CIMOM settings to generate a MOF file for the information handling system.

The present invention provides a number of important technical advantages. One example of an important technical advantage is that a precompiler tool automatically generates a MOF file in minimal time compared with a hand developed MOF. Automated MOF file generation avoids the mistakes inherent to hand creation of a MOF file to provide a MOF file containing all required parent, child and association classes as well as specialized CIMOM settings specific to operating systems, such as the WMI and Open WBEM CIMOMs. Maintaining standards based systems management is simplified and kept consistent through CIM version updates.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system MOF file for managing system operations is automatically generated for improved efficiency and accuracy of information handling system design. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
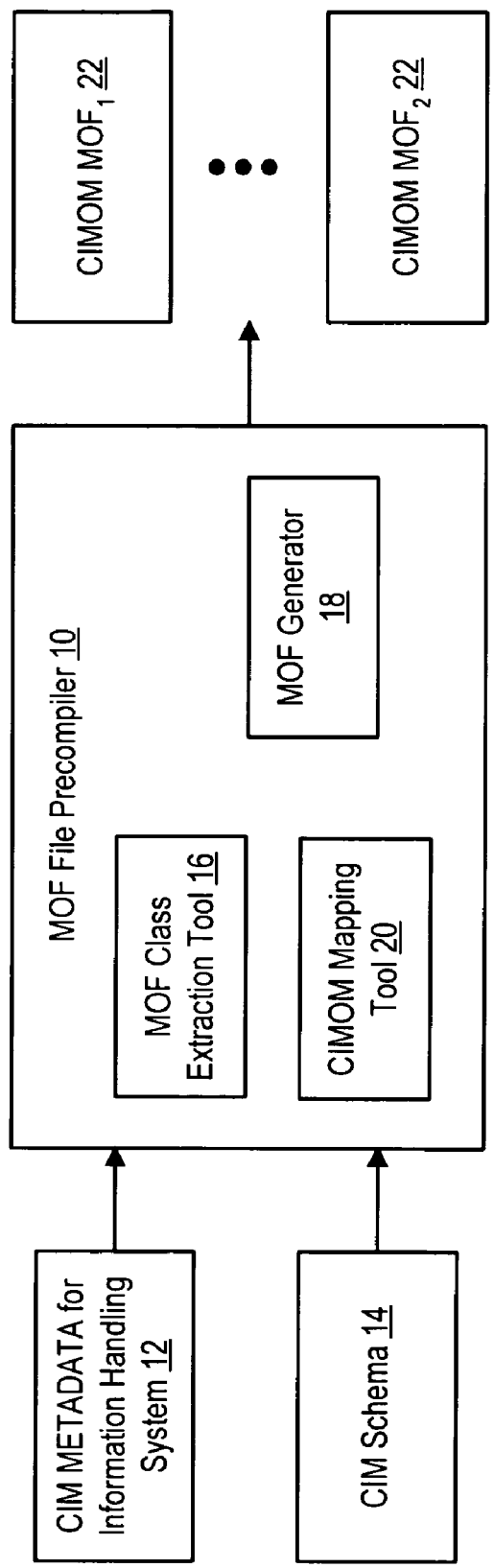
FIG. 1 depicts a block diagram of a system for automated generation of a MOF file for an information handling system.

Referring now to FIG. 1, a block diagram depicts a system for automated generation of a MOF file for an information handling system. A MOF file precompiler 10 is, for instance, instructions running on an information handling system that defines a MOF file for a given information handling system configuration. The configuration of the information handling system is represented by a CIM metadata 12 defined in a predetermined format, such as XML, to state the CIM classes associated with the components of the configuration. A CIM schema 14 represents all classes of the CIM used to define the configuration in the CIM metadata. A MOF class extraction tool 16 of MOF file precompiler 10 applies CIM metadata 12 and CIM schema 14 to extract the CIM classes associated with the information handling system metadata including all required parent, child and association classes. A MOF generator 18 orders the extracted classes to form a MOF file that defines the management of the information handling system configuration. A CIMOM mapping tool 20 maps differences between the CIMOMs associated with specific operating systems, such as WINDOWS WMI and Linux Open WBEM, and applies specialized settings of each to generate a CIMOM MOF file for each operating system.

Figure 2:
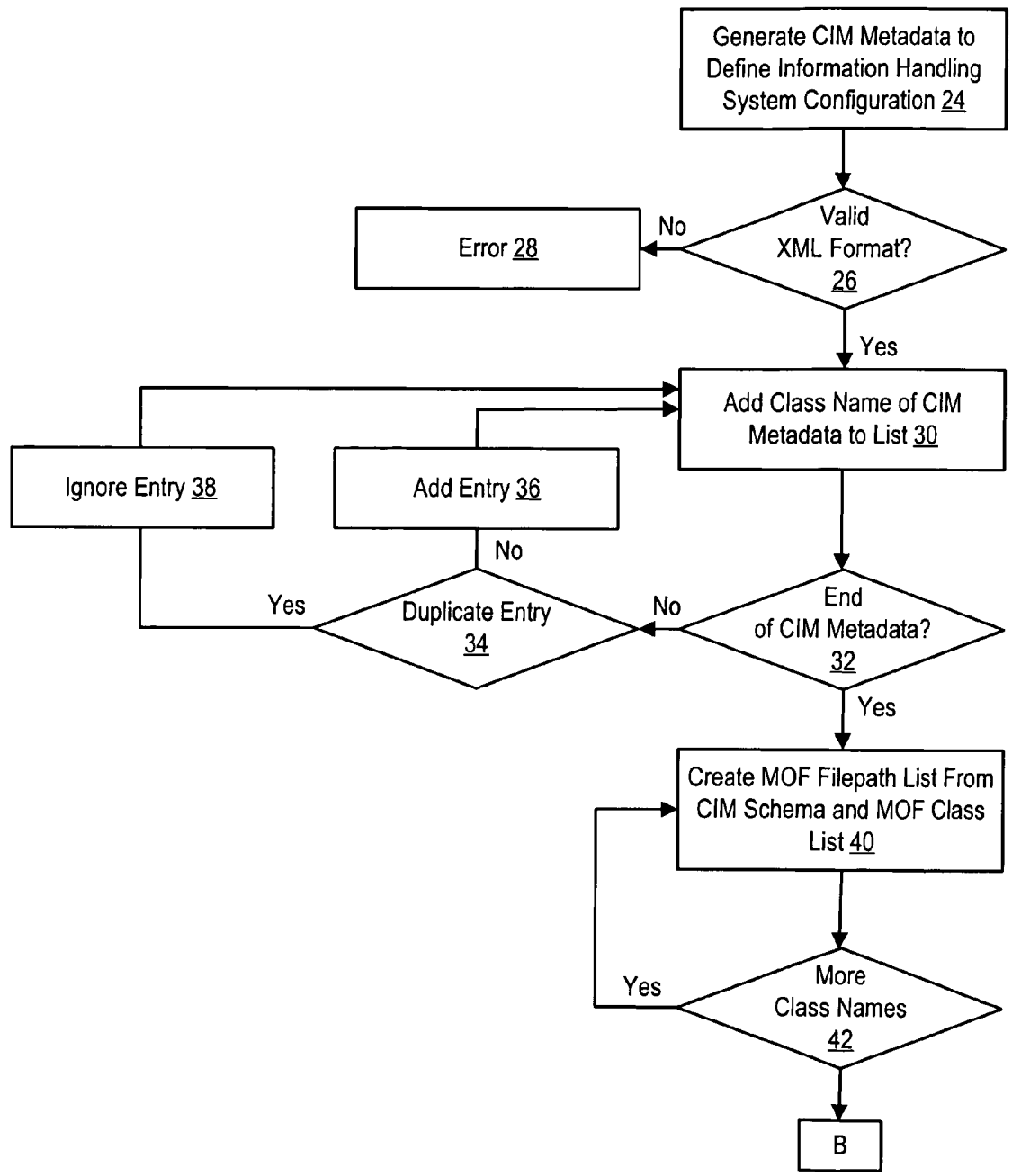
FIG. 2 depicts a flow diagram of a process for extracting MOF classes from a CIM schema and information handling system CIM metadata.

Referring now to FIG. 2, a flow diagram depicts a process for extracting MOF classes from a CIM schema and information handling system CIM metadata. At step 26, CIM metadata is generated in XML format to define CIM classes associated with an information handling system configuration. At step 26, the CIM metadata is checked to ensure a correct XML format with an error issued at step 28 if the format is incorrect. At step 30, each class name from within the CIM metadata is added to a list so that a complete list of class names for the information handling system CIM metadata is extracted. At step 32, if the class name last extracted is not the last class name of the CIM metadata, the process continues to step 34 to ensure the class name is not a duplicate entry to the list. If the name is not a duplicate, then at step 36 the class name is added to the list. If the name is a duplicate, then at step 38 the class name is ignored and not added to the list. Once the end of the CIM metadata is reached at step 32, the list of class names is complete and the process continues to step 40 to create a MOF filepath list from the CIM schema and MOF class name list. For each class name, a MOF filepath is extracted from the CIM schema at step 40 and a check is made at step 42 of whether more class names remain. Once a MOF file path is created for each class name, the process continues to the generation of an ordered MOF class list in FIG. 3.

Figure 3:
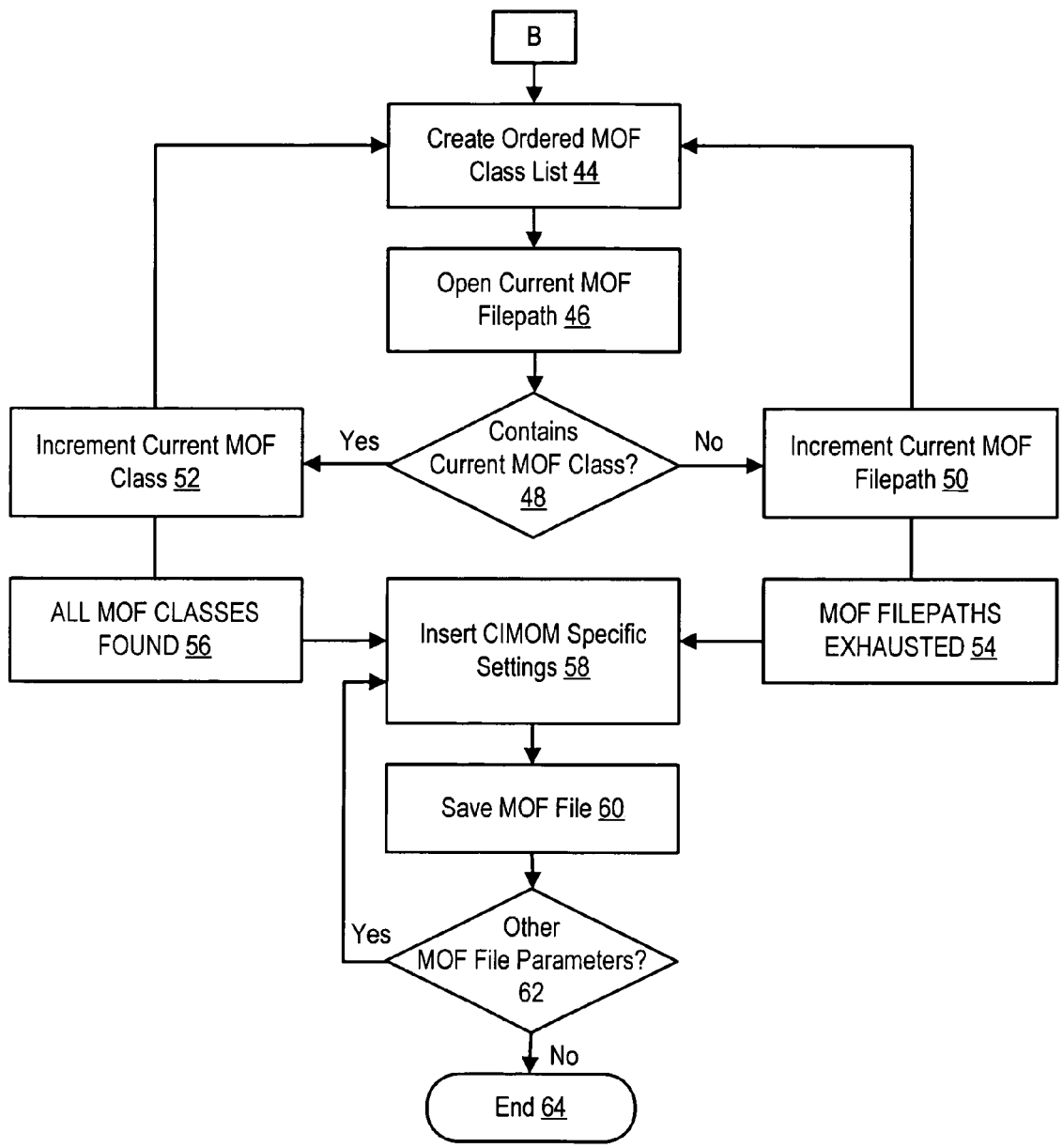
FIG. 3 depicts a flow diagram of a process for automatically generating a MOF file from the extracted MOF classes.

Referring now to FIG. 3, a flow diagram depicts a process for automatically generating a MOF file from the extracted MOF classes. At step 44, an ordered list is created from the MOF class list provided by application of the CIM schema and CIM metadata. The MOF class list filepaths include the required parent, child and association classes in the MOF class filepaths. At step 46, the current MOF filepath is opened and, at step 48, checked to determine if it contains the current MOF class. If the current MOF filepath does not contain the current MOF class, the process continues to step 50 to increment the current MOF filepath and returns to step 44 to order the MOF class list. If at step 48 the current MOF filepath contains the current MOF class, the process continues to step 52 to increment the current MOF class and returns to step 44 to order the MOF class list. Once all of the filepaths are exhausted at step 54 or all of the MOF classes are exhausted at step 56, the process continues to step 58 insert the CIMOM specific settings for the desired operating system. For instance, the following settings are made for a WINDOWS WMI MOF compiler in the MOF header settings:

```
#pragma classflags('forceupdate')
#pragma namespace('\\\\.\\Root\\CIMV2')
[Locale(1033):ToInstance]
Instance of_Namespace
{
Name ='SMWG';
};
#pragma namespace ('\\\\.\\Root\\CIMV2\\SMWG')
instance of_Win32Provider as $P
{
Name = 'vendor_provider';
ClsId = '{347B30C2-22!9-4029-A130-BOE755F15A1F }';
};
Instance of_InstanceProviderRegistration
{
Provider =$P;
SupportsGet = 'TRUE';
SupportsPut = 'TRUE';
SupportsDelete = 'FALSE';
Supports Enumeration = 'TRUE';
};
Instance of_MethodProviderRegistration
{
Provider=$P;
};
```

For the Linux Open WBEM MOF compiler, the MOF header settings are:

pragma namespace('root/cimv2')

pragma namespace('root/cimv2/smwg');

the qualifiers are swapped from "[Abstract, Association," to "[Association, Abstract"; the "Dynamic" qualifier is removed; and the qualifier "Provider ("vendor_provider")"is changed to "provider("c++:vendor_provider")". At step 60, the MOF file is saved with the special settings made for the desired operating system CIMOM and the process continues to step 62 to determine if other MOF file parameters exist. If so, the process returns to step 58 to insert specific settings for other desired operating systems. Once a MOF file is created for each operating system CIMOM, the process ends at step 64.

Although the present invention has been described in detail, it should be understood that various changes, substitutions and alterations can be made hereto without departing from the spirit and scope of the invention as defined by the appended claims.

What is claimed is:

1. An information handling system implemented system for generating an information handling system MOF file, the system comprising:
   - an information handling system configured to process information, the information handing system having a processor and one or more storage devices;
   - a CIM schema defining plural MOF classes and stored on the storage device;
   - a CIM metadata defining MOF classes for the configuration of the information handling system and stored on the one or more storage devices;
   - a MOF class extraction tool executed on the processor and configured to extract selected MOF classes from the CIM schema based on the MOF classes defined in the CIM metadata; and
   - a MOF generator executed on the processor and operable to apply the selected MOF classes and CIM metadata to generate a MOF file for storage on the one or more storage devices.

2. The system of claim 1 wherein the selected MOF classes extracted by the extraction tool comprise parent, child and association classes referenced by the CIM metadata.

3. The system of claim 1 further comprising a CIMOM mapping tool configured to map differences between a first operating system CIMOM and a second operating system CIMOM and to apply the differences at the MOF generator to create a first MOF file associated with the first operating system and a second MOF file associated with the second operating system.

4. The system of claim 1 wherein the MOF class extraction tool extracts the selected MOF classes by:
   - generating a list of class names from the CIM metadata;
   - applying each class name from the list to create a MOF filepath from the CIM schema; and
   - ordering the MOF classes in each MOF filepath.

\* \* \* \* \*